United States Patent [19]
Appenzeller

[11] Patent Number: 5,341,856
[45] Date of Patent: Aug. 30, 1994

[54] ARRANGEMENT FOR CONVEYING DUST-LIKE BULK GOODS, PARTICULARLY CEMENT, BY MEANS OF SUCTION AND PRESSURE

[75] Inventor: Gerhard Appenzeller, Seevetal, Fed. Rep. of Germany

[73] Assignee: Ibau Hamburg Ingenieurgesellschaft Industriebau mbH, Hamburg, Fed. Rep. of Germany

[21] Appl. No.: 75,735

[22] Filed: Jun. 11, 1993

[30] Foreign Application Priority Data

Jun. 13, 1992 [EP] European Pat. Off. ......... 92109963.6

[51] Int. Cl.⁵ .................. B65B 1/08; B65B 1/16
[52] U.S. Cl. ......................... 141/67; 141/231; 141/256; 141/98; 414/303; 414/139.9; 406/39; 406/151
[58] Field of Search .............. 414/292, 298, 299, 300, 414/301, 303, 310, 326, 139.9, 142.2; 220/8, 562; 141/67, 114, 231, 98, 256, 8, 255, 259, 44, 45; 406/39, 41, 151, 173, 171, 168, 56, 61

[56] References Cited

U.S. PATENT DOCUMENTS

| | | | |
|---|---|---|---|
| 2,087,464 | 7/1937 | Ayers | 406/168 |
| 2,703,733 | 3/1955 | Stueven | 406/39 |
| 3,114,468 | 12/1963 | Quase | 220/8 |
| 3,819,069 | 6/1974 | Bauman et al. | 141/67 |
| 3,942,561 | 3/1976 | Stoeffler | 141/67 |
| 4,449,724 | 5/1984 | Ahn | 220/8 |
| 4,913,597 | 4/1990 | Christianson et al. | 406/39 |
| 4,988,240 | 1/1991 | Thompson | 406/41 |

FOREIGN PATENT DOCUMENTS

| | | |
|---|---|---|
| 195318 | 5/1957 | Austria . |
| 1117043 | 11/1961 | Fed. Rep. of Germany . |
| 3115125C2 | 1/1982 | Fed. Rep. of Germany . |
| 3141065A1 | 6/1982 | Fed. Rep. of Germany . |
| 3225505 | 7/1982 | Fed. Rep. of Germany . |

OTHER PUBLICATIONS

Patent Abstracts of Japan, vol. 12, No. 296 (M-731)(3143) Aug. 12, 1988 & JP-A-63 074 818 (Kayaba Ind Co) Apr. 5, 1988.

*Primary Examiner*—Ernest G. Cusick
*Assistant Examiner*—Steven O. Douglas
*Attorney, Agent, or Firm*—Feiereisen & Kueffner

[57] ABSTRACT

An arrangement for transferring bulk goods from ships into silos by means of suction and pressure conveyance. The arrangement includes a suction conveying line with suction nozzle to be placed in the ship and leading to a lock-type receiving container. A pressure-conveying line leads from the container to the silo. A screw-type pump is provided at the bottom of the container for continuously feeding the material to the pressure conveying line. The material travels through the container by gravity. The receiving container includes container segments which are arranged so as to be telescopically extendable. All components of the arrangement are mounted on a road-travelling vehicle. During operation, the segments of the container are extended. During travel, the container segments are slid into each other.

5 Claims, 2 Drawing Sheets

ARRANGEMENT FOR CONVEYING DUST-LIKE BULK GOODS, PARTICULARLY CEMENT, BY MEANS OF SUCTION AND PRESSURE

BACKGROUND OF THE INVENTION

1. Field of the Invention

The present invention relates to an arrangement for transferring or transshipping dust-like bulk goods or loose goods, particularly cement, by means of suction and pressure from ships or the like into silos. The arrangement includes a negative pressure producing apparatus or suction conveying line leading into a receiving container. A pressure conveying line extends from the receiving container to the silo.

2. Description of the Related Art

In arrangements of the above-described type, generally combined suction and pressure containers are used. Bulk material, for example, cement, is taken up or sucked by a suction nozzle from a cargo area and is conveyed into a container. After the container has been filled, the container becomes a pressurized container and the cement is conveyed from the container through a pipeline into a silo, as described in DE-31 15 125 C2. Accordingly, an alternating operation or a batchwise conveyance is carried out at all times. In these known arrangements, there are limitations with respect to the capacity and the conveying distance because of the use of a Venturi nozzle. On the other hand, a suction fan is not required.

OS 31 410 65 A1 discloses two containers as they are also found in other embodiments and as they are usually used in practice. The containers operate with alternating suction and pressure and correspond to a lock-type system with continuously changing pressure applications on the locking devices used for control, such as, flaps or valves. The valves are subjected to substantial wear and are susceptible to leaks and, therefore, result in capacity losses. Another particular disadvantage is seen in the fact that pressure impact loads occur at the receiving silo at high frequencies. After each time the container is emptied, the pressurized air contained in the container during the emptying phase is suddenly relaxed and acts on the silo container with filter unit. If damage or dust leaks are to be avoided, additional devices must be provided which may be very expensive and complicated. This disadvantage of the known arrangements becomes more serious as the quantity of material being conveyed increases and as the container sizes increase, and when the arrangement is used for different receiving stations. All known arrangements have in common that they are more or less stationary, i.e., it is difficult if not impossible to transport these arrangements.

The limited mobility of these arrangements is particularly true in case of large quantities of material being conveyed because the above-described arrangements and methods of operation require large dimensions of the arrangements which make it impossible to transport the arrangements on roads or rails.

SUMMARY OF THE INVENTION

Therefore, it is the primary object of the present invention to provide an arrangement of the above-described type which is mobile and meets the requirements of travel regulations and which is still usable for large quantities of material being conveyed and for long conveying distances. In addition, the arrangement is not only to be usable at different locations, but also under very different operating conditions. In addition, the arrangement is to be uncomplicated and sturdy.

In accordance with the present invention, the receiving container is a lock-type container to which the bulk material is supplied continuously and from which the bulk material is removed continuously. A screw-type pump is provided in the bottom area of the container. The bulk material is conveyed to the screw-type pump by gravitation. A positive pressure producing apparatus or pressure conveying line is provided for conveying the bulk material from the screw-type pump to the silo. All components of the arrangement are mounted on a vehicle which can travel on roads. The container is composed of container segments which can be arranged on top of each other and which can be slid into each other telescopically.

The arrangement according to the present invention operates continuously. In other words, a slight negative pressure prevails in the upper portion of the container into which the suction conveying line opens. In the bottom area, the bulk material is supplied to the conveying screw by gravity. For this purpose, it is necessary that an appropriate bulk material column is maintained above the screw-type pump. A level tester is preferably used for this purpose. The telescopic configuration of the container makes it possible to construct this container with the necessary height, while still making it possible to insure that the container segments can be slid into each other during travel on roads, so that the vehicle with the arrangement is not overdimensioned. Thus, during operation when transferring bulk material, the container has the necessary height while it has the required dimensions during travel on roads.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there is illustrated and described a preferred embodiment of the invention.

DESCRIPTION OF THE PREFERRED EMBODIMENTS

Figure 1:
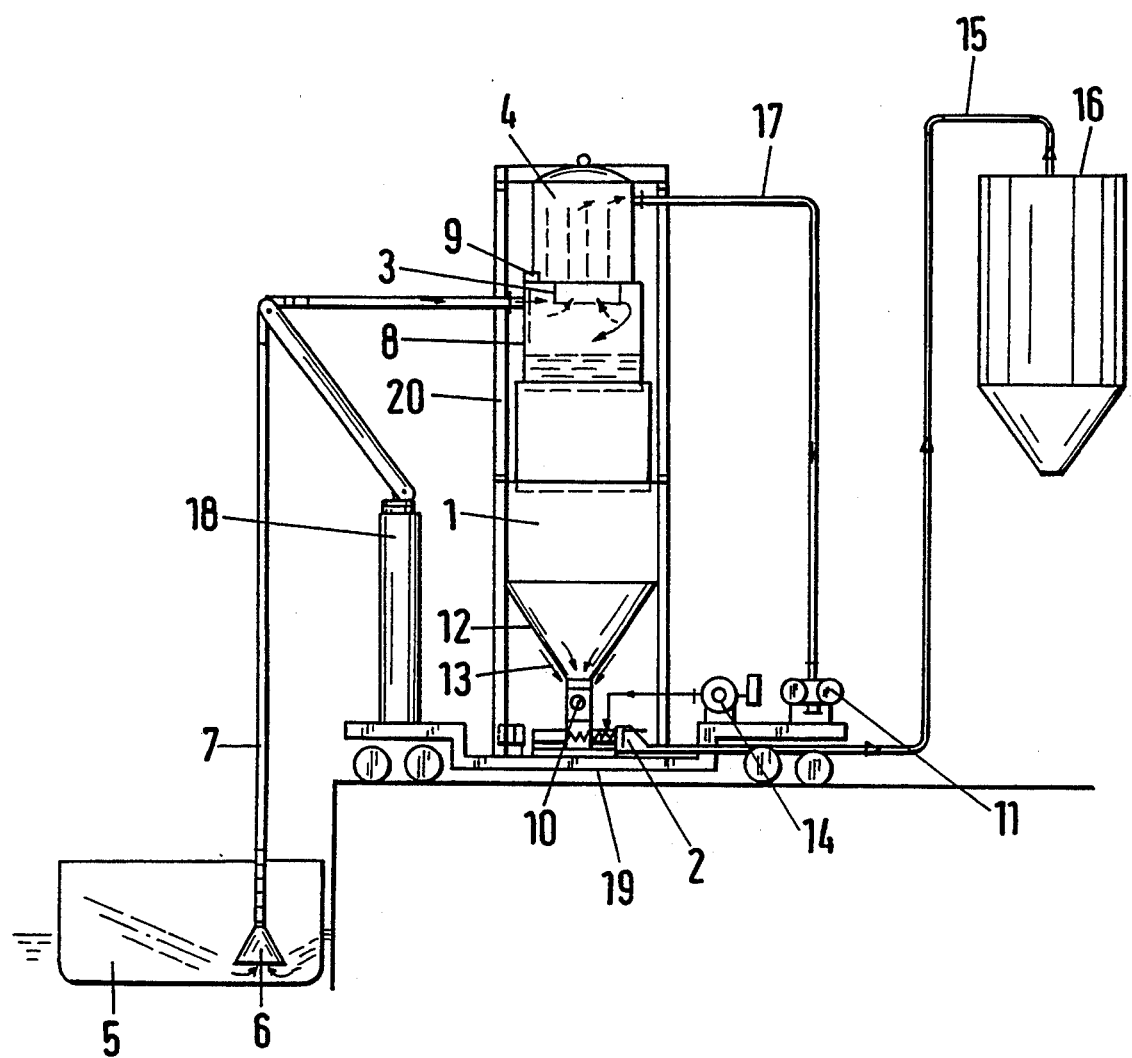
FIG. 1 is a schematic view of an embodiment of the arrangement according to the invention in the extended state, arranged on a vehicle during unloading of a ship.
Figure 2:
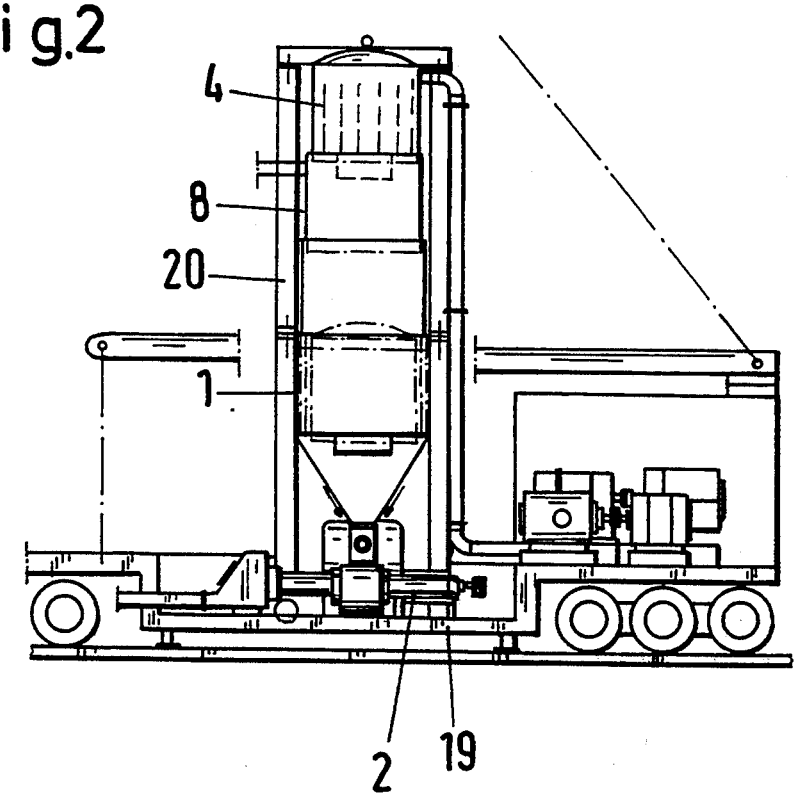
FIG. 2 is a view, on a smaller scale, showing the container with extended container segments.

The arrangement illustrated in the drawing includes a lock-type container 1 which is divided into several container segments 8 which are arranged on top of each other. As illustrated in FIGS. 1 and 2, the container segments are extended, so that the container has the required height for carrying out a continuous operation. The upper container segment is formed by an exhaust-air filter 4. A centrifugal preliminary separator 3 reduces the load on the exhaust-air filter 4.

The bottom container segment has a funnel-shaped portion 12 with an auxiliary loosening device 13. The funnel-shaped portion leads through a metering slide member 10 to a screw-type pump 2. The metering slide member 10 is controlled by means of a level tester 9. This insures a constant filling level above the metering slide member 10 at the entry to the screw-type pump 2.

A suction conveying line 7 with a suction nozzle 6 leads from the ship to be unloaded to the upper container segment 8.

The screw-type pump 2 supplies the pressure conveying line 15 which leads to a silo 16.

The negative pressure is produced by means of a fan 11 and is applied to the upper portion of the exhaust-air filter 4 through a line 17. A compressor 14 produces the pressure for effecting the conveyance into the pressure conveying line 15.

In addition, a lifting device 18 in the form of a crane is provided for moving the suction conveying line 7 with the suction nozzle 6 and for mounting the telescopic lock-type container, i.e., for extending and sliding together the individual container segments 8. The container segments 8 are supported by extendable columns 20. In addition, sealing rings or sleeves are provided which seal the container segments relative to each other in the extended state so that the desired negative pressure can be maintained with very little losses.

Figure 3:
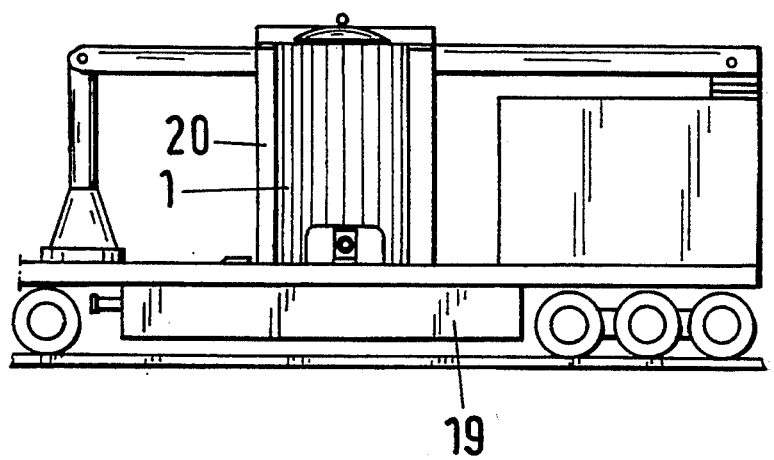
FIG. 3 is a view, corresponding to FIG. 2, with the container segments being slid together.

When the arrangement has been transported with the vehicle 19 in the position shown in FIG. 3 to the desired unloading location, the arrangement is extended, so that it assumes the position illustrated in FIGS. 1 and 2. For this purpose, the individual container segments 8 are lifted by means of the lifting device 18 out of the lower container segment with the funnel-shape portion 12. This is also true for the exhaust-air filter 4 arranged at the top. Once this state has been reached, the arrangement is ready for use. A negative pressure in the range of 0.5 bar is maintained in the upper portion of the container by means of the fan 11. This negative pressure is not very substantial. However, it is sufficient for sucking the material from the ship 5 and for transferring it into the area of the upper container segment 8. In the upper segment 8, a level tester 9 is provided. The level tester 9 insures that always a certain filling level exists above the metering slide member 10, so that the bulk material moves downwardly as a result of gravity into the funnel-shape portion 12 and, thus, into the screw-type pump 2. The conveying air is separated from solid materials and is cleaned and escapes to the atmosphere through the suction fan 11.

For conveying the bulk material to the silo 16, compressed air is blown into an exit housing of the screw-type pump 2 by means of the compressor 14. The clean air connection between the exhaust-air filter 4 and the suction fan 11 is effected through the line 17.

The metering slide member 10 is subjected to low pressure because the auxiliary loosening unit 13 is aerated only at approximately 400 mbar.

After unloading has been concluded, the arrangement is again returned into the position shown in FIG. 3 by means of the lifting device 18.

The invention is not limited by the embodiment described above which is presented as an example only but can be modified in various ways within the scope of protection defined by the appended patent claims.

I claim:

1. An arrangement for transferring dust-like bulk goods, particularly cement, from an unloading location, such as a ship, to a silo, the arrangement comprising a receiving container, the receiving container comprising a plurality of telescopically extendable container segments, the container segments including a top container segment and a bottom container segment, a negative pressure producing apparatus for continuously supplying the bulk goods being connected to the receiving container, a screw-type pump mounted at the bottom container segment for continuously discharging the bulk goods from the receiving container, such that the bulk goods travel through the receiving container by gravity, and a positive pressure producing apparatus for conveying the bulk goods from the screw-type pump to the silo, wherein all components of the arrangement are mounted on a road-travelling vehicle.

2. The arrangement according to claim 1, wherein the top container segment comprises an exhaust-air filter.

3. The arrangement according to claim 1, comprising an adjustable metering slide member at an entry to the screw-type pump, and a level tester for monitoring the level of the bulk goods in the receiving container and for controlling the metering slide member for maintaining a constant level of the bulk goods in the receiving container above the screw-type pump.

4. The arrangement according to claim 1, comprising sealing elements between the container segments.

5. The arrangement according to claim 1, comprising a lifting unit mounted on the road-travelling vehicle for extending the container segments and for moving a suction nozzle arranged at an end of the negative pressure producing apparatus.

* * * * *